US007552177B2

(12) United States Patent
Kessen et al.

(10) Patent No.: US 7,552,177 B2
(45) Date of Patent: Jun. 23, 2009

(54) METHOD FOR DETERMINING AVAILABILITY OF PARTICIPATION IN INSTANT MESSAGING

(75) Inventors: Bethany Lyn Kessen, Austin, TX (US); Craig M. Lawton, Raleigh, NC (US); Jonathan Andrew Lewis, Morrisville, NC (US); Martin Thomas Moore, San Francisco, CA (US); Jesse B. Overby, III, Raleigh, NC (US); Christopher Andrew Peters, Pflugerville, TX (US); Lorin Evan Ullmann, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 818 days.

(21) Appl. No.: 10/902,596

(22) Filed: Jul. 29, 2004

(65) Prior Publication Data
US 2006/0026254 A1 Feb. 2, 2006

(51) Int. Cl.
*G06F 15/16* (2006.01)
(52) U.S. Cl. .................. 709/206; 709/204; 709/205; 715/751; 715/752; 715/753
(58) Field of Classification Search ................. 709/206, 709/205, 204; 455/466
See application file for complete search history.

(56) References Cited

U.S. PATENT DOCUMENTS

| 5,365,360 | A | 11/1994 | Torres | 395/159 |
|---|---|---|---|---|
| 5,694,616 | A | 12/1997 | Johnson et al. | 395/860 |
| 5,793,365 | A | 8/1998 | Tang et al. | 345/329 |
| 5,877,763 | A | 3/1999 | Berry et al. | 345/345 |
| 5,880,731 | A | 3/1999 | Liles et al. | 345/349 |
| 6,067,355 | A | 5/2000 | Lim et al. | 379/142 |
| 6,076,093 | A | 6/2000 | Pickering | 707/104 |
| 6,396,513 | B1 | 5/2002 | Helfman et al. | 345/752 |

(Continued)

FOREIGN PATENT DOCUMENTS

WO   WO 00/60444   10/2000

OTHER PUBLICATIONS

IBM Technical Disclosure Bulletin, vol. 32, No. 6B, Nov. 1989, "Mail-Waiting Icon for PC-Based Office System", pp. 173-174.

(Continued)

*Primary Examiner*—Larry D Donaghue
*Assistant Examiner*—Adnan M Mirza
(74) *Attorney, Agent, or Firm*—Justin M. Dillon

(57) ABSTRACT

A method, apparatus, and computer instructions for sending a user's availability information to an instant messaging (IM) partner. A user predefines areas of the user's display and associates these predefined areas, or "hotspots", with user defined messages. If the user is not available to immediately respond to an incoming message, the user may move the IM dialog window to a "hotspot" in the display. Depending upon the user-defined message associated with the "hotspot", the IM application generates an automated response indicating the user's availability to respond to the message, and sends the message to the IM partner. The user also may predefine and associate the user's IM status with a "hotspot". Moving an IM dialog window into a "hotspot" automatically changes the user's status based on the associated "hotspot". This change is communicated to only the particular IM dialog window partner while other IM partners are unaffected.

33 Claims, 7 Drawing Sheets

U.S. PATENT DOCUMENTS

| | | | |
|---|---|---|---|
| 6,473,103 B1 | 10/2002 | Bailey et al. | 345/794 |
| 6,476,830 B1 | 11/2002 | Farmer et al. | 345/769 |
| 6,501,834 B1 | 12/2002 | Milewski et al. | 379/93.24 |
| 6,559,863 B1 | 5/2003 | Megiddo | 345/753 |
| 6,640,230 B1 | 10/2003 | Alexander et al. | 707/10 |
| 7,292,870 B2 * | 11/2007 | Heredia et al. | 455/466 |
| 2002/0035480 A1 | 3/2002 | Gordon et al. | 705/1 |
| 2003/0076353 A1 | 4/2003 | Blackstock et al. | 345/751 |
| 2003/0210265 A1 | 11/2003 | Haimberg | 345/758 |
| 2004/0054667 A1 | 3/2004 | Kake et al. | 707/3 |

OTHER PUBLICATIONS

U.S. Appl. No. 10/875,945, Kessen et al., Associating an Instant Message Dialog with Scren Real Estate and Role Based Positioning, filed Jun. 24, 2004.

U.S. Appl. No. 10/902,593, Kessen et al., Using Windowed User Interface Z-Order with Collaboration Data for Improved Management of Acknowledge of Incoming Instant Messages, filed Jul. 29, 2004.

* cited by examiner

METHOD FOR DETERMINING AVAILABILITY OF PARTICIPATION IN INSTANT MESSAGING

BACKGROUND OF THE INVENTION

1. Technical Field

The present invention relates generally to an improved data processing system and in particular, to a method, apparatus, and computer instructions for processing and displaying messages. Still more particularly, the present invention provides a method, apparatus, and computer instructions for generating an automated status message in response to moving an instant messaging dialog window to a designated area of a display.

2. Description of Related Art

Instant messaging is an online chat medium, allowing users to communicate with each other and to collaborate in real-time over a network data processing system. Instant messaging is commonly used over the Internet. Instant messaging applications monitor and report the status of users that have established each other as online contacts. This information is typically presented to a user in a window. Instant messaging applications also are often used by users conducting business. By utilizing instant messaging, business users can view each other's availability and initiate a text conversation with colleagues or customers when a desired contact becomes available. Millions of users communicate using instant messaging systems every day. With instant messaging becoming an important part of both personal and business communications, functionality and usability enhancements are important to the continued success of this type of communication tool.

Current instant messaging systems provide information to a message sender regarding the response to the message. For example, information may be returned to the sender regarding if a response to the message is currently being typed. Additionally, a user may configure his messaging system to automatically return a do not disturb flag or an "away" message to a sender if the user is busy or not in the office. However, a problem with instant messaging technology is that it is currently cumbersome for the user to instant message their availability status to the message sender and then perhaps resend their status as it changes over time. The user may also forget to take off the away message or the do not disturb flag. Thus, existing messaging systems offering automated response messages may provide incorrect information.

Therefore, it would be advantageous to have a method, apparatus, and computer instructions for allowing a user to send an automated response message to a message sender by moving the user's instant messaging dialog window to a designated area of the user's display.

SUMMARY OF THE INVENTION

The present invention provides a method, apparatus, and computer instructions for sending a user's availability information to an instant messaging partner. An automated response message is sent to the instant messaging partner in response to a user moving the user's instant messaging dialog window to a particular area of the user's display. The mechanism of the present invention allows the user to predefine areas of the user's display and to associate these predefined areas, or "hotspots" with user defined messages. If the user receives an instant message, but is not available to respond to the message, the user may move the instant messaging dialog window to a "hotspot" in the display. Depending upon the user-defined message associated with the "hotspot", the instant messaging application generates an automated response regarding the user's availability to respond to the message. The automated message is then sent to the instant messaging partner.

Additionally, moving a dialog window to a "hotspot" may create a temporary change in the user's status as well. This change may be applied to only the participant of the particular dialog window moved to the hotspot. For instance, when a dialog window is in a hotspot area, the user who initiated the "hold" action will have "do-not-disturb" status associated with that particular dialog window, while other incoming messages are not affected. When the dialog window is removed from the "hotspot" area or the user resumes the conversation with the blocked partner, the "hold" indication is cleared.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
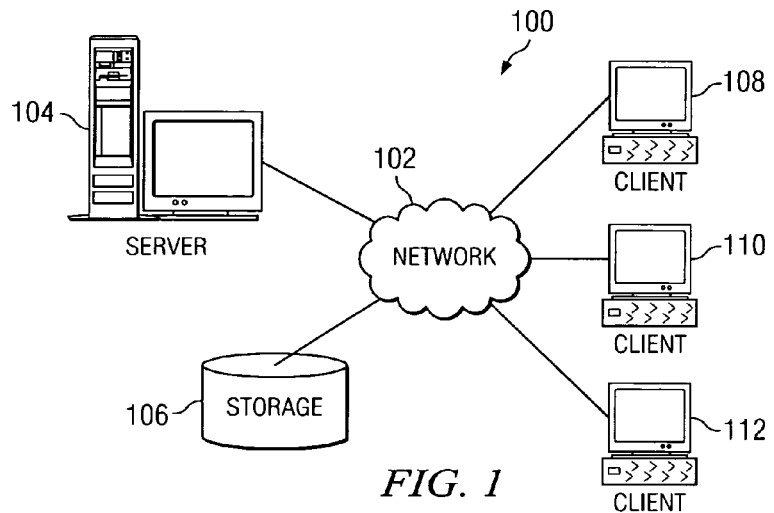
FIG. 1 depicts a representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers or personal digital assistants (PDAs). In the depicted example, server 104 provides data, such as boot files, operating system images, and applications to clients 108-112. Clients 108, 110, and 112 are clients to server 104. Server 104 may act as an instant messaging server to facilitate the exchange of messages between users at clients, such as clients 108, 110, and 112. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
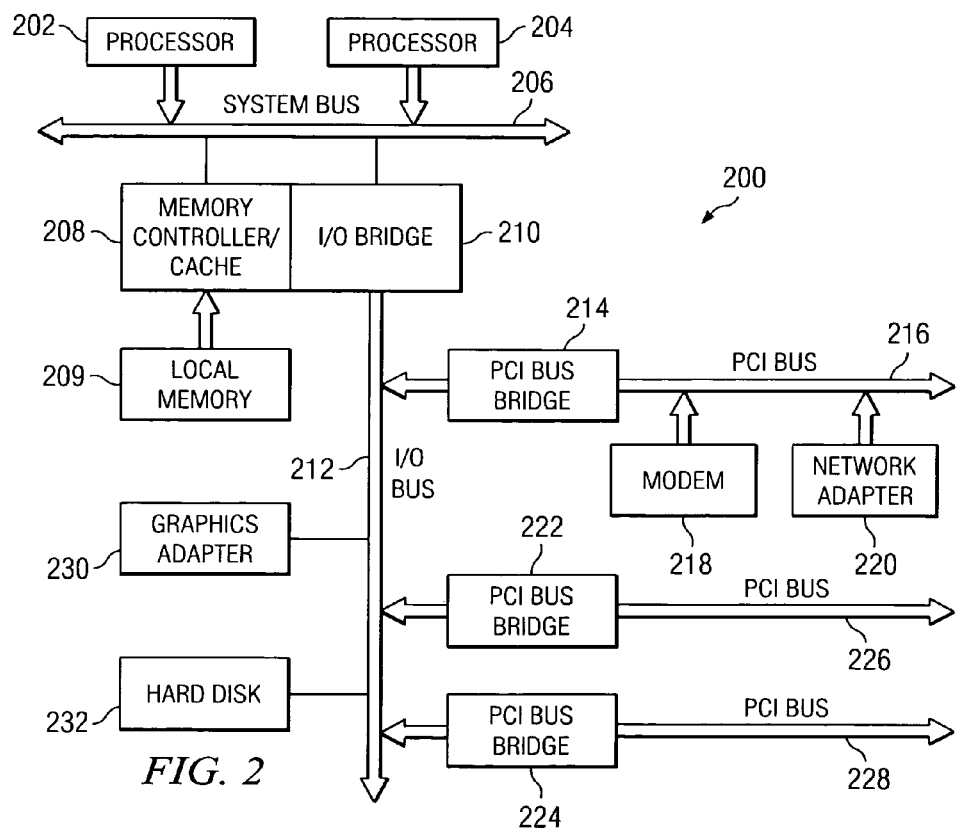
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Figure 3:
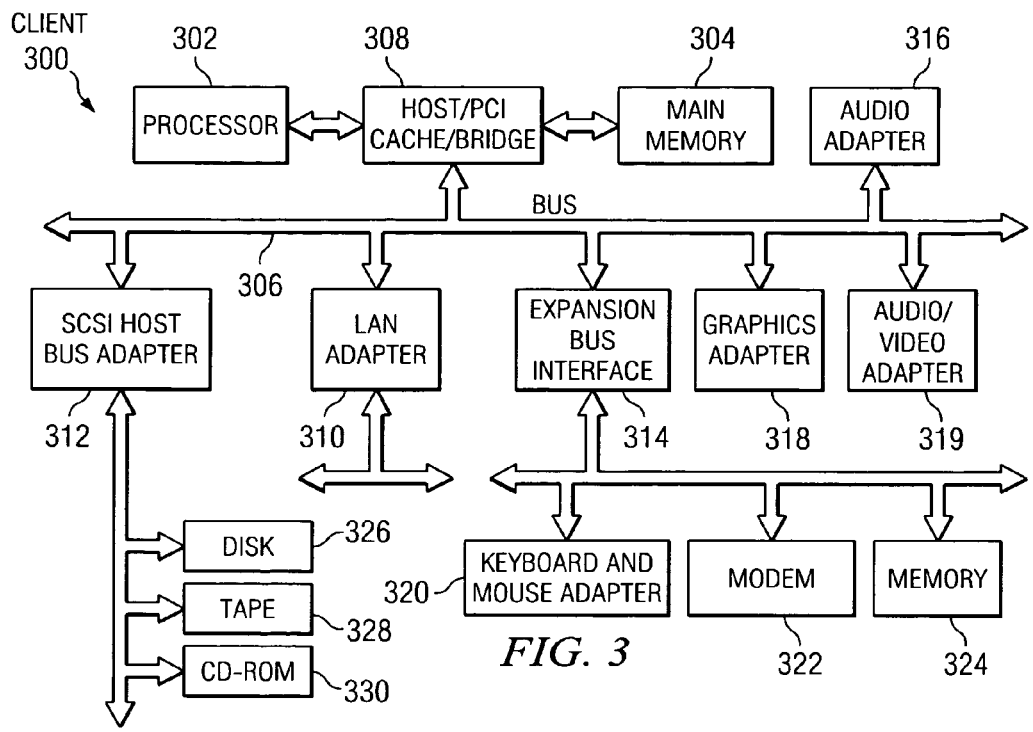
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention provides a method, apparatus, and computer instructions for sending a user's status information to an instant messaging partner by generating an automated status message in response to the user moving an instant messenger dialog window to an assigned or preselected area of a display. The present invention offers an advantage over current instant messaging systems by allowing a user's status information, such as whether the user has placed the instant messaging conversation on "hold", to be presented to an instant messaging partner if the user places the dialog window in a designated area of the user's display. In this manner, a user may provide status information to an instant messaging partner regarding when the user is available to respond to the instant messaging partner.

When an instant messaging user receives an instant message, the user may not be able to immediately respond to the message. For example, the user may be working and does not want to be interrupted, or the user may receive a important phone call. If the user wants to delay responding to the message, the user may move the instant messaging dialog window to an area on the display, such as a "hotspot". The mechanism of the present invention allows the user to predefine areas of the user's display and to associate these predefined areas, or "hotspots" with user defined message. When the instant messaging application detects that an instant messaging dialog window has been moved to a designated "hotspot", the instant messaging application generates an automated response indicating the user's unavailability to respond to the message. Subsequently, the automated message is sent to the instant messaging partner. In this manner, instant messaging users may communicate their availability status to their instant message partners, by moving the dialog window to a designated area of the display, with a minimum of effort and time.

Figure 4:
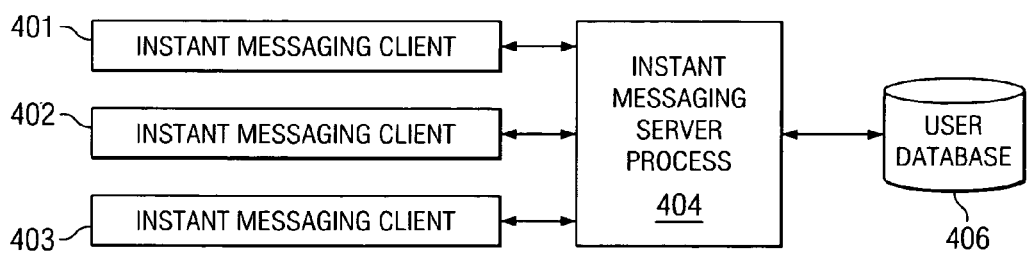
FIG. 4 is a block diagram illustrating components used in managing messages in accordance with a preferred embodiment of the present invention.

Turning now to FIG. 4, a block diagram illustrating components used in an instant messaging system in accordance with a preferred embodiment of the present invention is shown. In this illustrative example, a user at instant messaging client 401 may send or exchange messages with other users at instant messaging clients 402 and 403. These instant messaging clients may be executing on a data processing system, such as data processing system 300 in FIG. 3. The exchange of messages in these examples is facilitated through instant messaging server process 404. This process allows for users to find other users within the instant messaging system as well as aid in the exchange of messages between different users.

Depending on the particular instant messaging system, instant messaging server process 404 may only be involved in providing an indication of when particular users are online and for establishing initial contacts while users contacting users already on a buddy list may contact those users directly after seeing that a particular user is online. Instant messaging server process 404 may be located on a server, such as data processing system 200 in FIG. 2.

In these examples, the different users registered to the instant messaging system are stored in user database 406. This user database provides information needed to search for and find other users as well as contact users when they are online.

Figure 5:
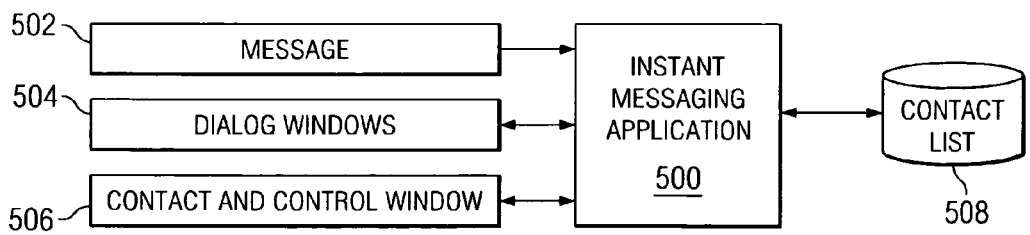
FIG. 5 is a diagram illustrating an instant messaging client in accordance with a preferred embodiment of the present invention.

Turning next to FIG. 5, a diagram illustrating an instant messaging client is depicted in accordance with a preferred embodiment of the present invention. The components illustrated in FIG. 5 may be found in an instant messaging client, such as instant messaging client 401, 402, or 403 in FIG. 4. These components may be implemented in a data processing system, such as data processing system 300 in FIG. 3.

In the illustrative example, instant messaging application 500 processes messages, such as message 502, received from users located on remote data processing systems. As messages are received, these messages are presented in dialog windows 504. Additionally, dialog windows 504 provide an interface for a user to input text to send messages to other users.

Contact and control window 506 is presented by instant messaging application 500 to provide the user with a list of user names, as well as other information. Contact and control window 506 also provides an interface to allow a user to set different preferences. For example, the user may set passwords required to access different names used in instant messaging sessions.

Also, a user may employ contact and control window 506 to set other preferences, such as colors and fonts used in instant messaging application 500. These preferences also may include whether a picture is to be sent when a session is initiated with another user. Depending on the implementation, the preference may be set to allow a user who receives messages to retrieve images of the senders from a remote database or a local cache.

Further, a list of names presented by contact and control window 506 are stored in contact list 508 in these examples. Additional user or screen names may be added to or deleted from contact list 508. This contact list is employed in presenting the list of names within contact and control window 506.

Figure 6A:
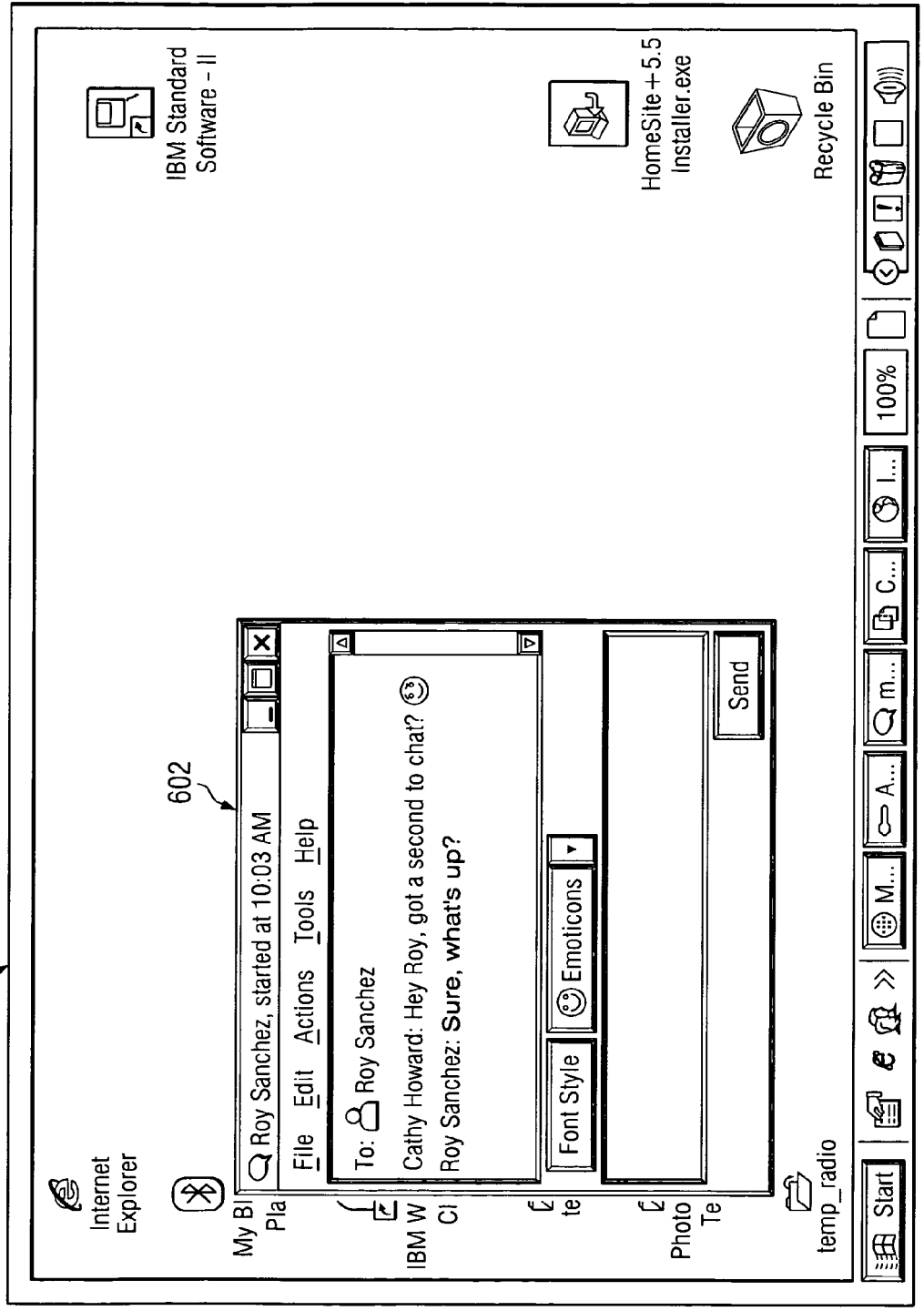
FIGS. 6A-6C illustrate an example of how placing an instant messaging dialog window into a designated area of a user's display allows an automated message to be sent to an instant message partner in accordance with a preferred embodiment of the present invention.
Figure 6B:
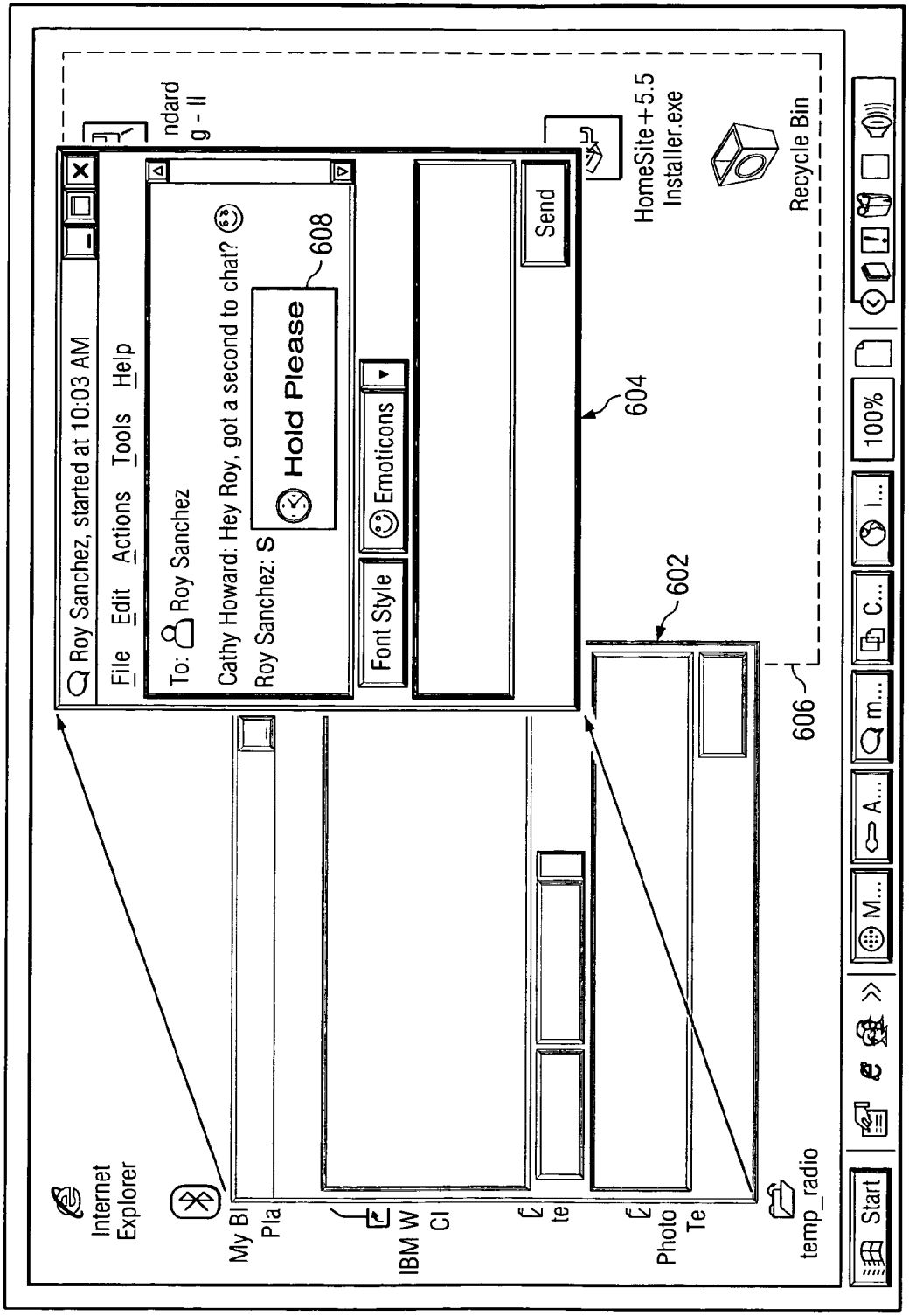
Figure 6C:
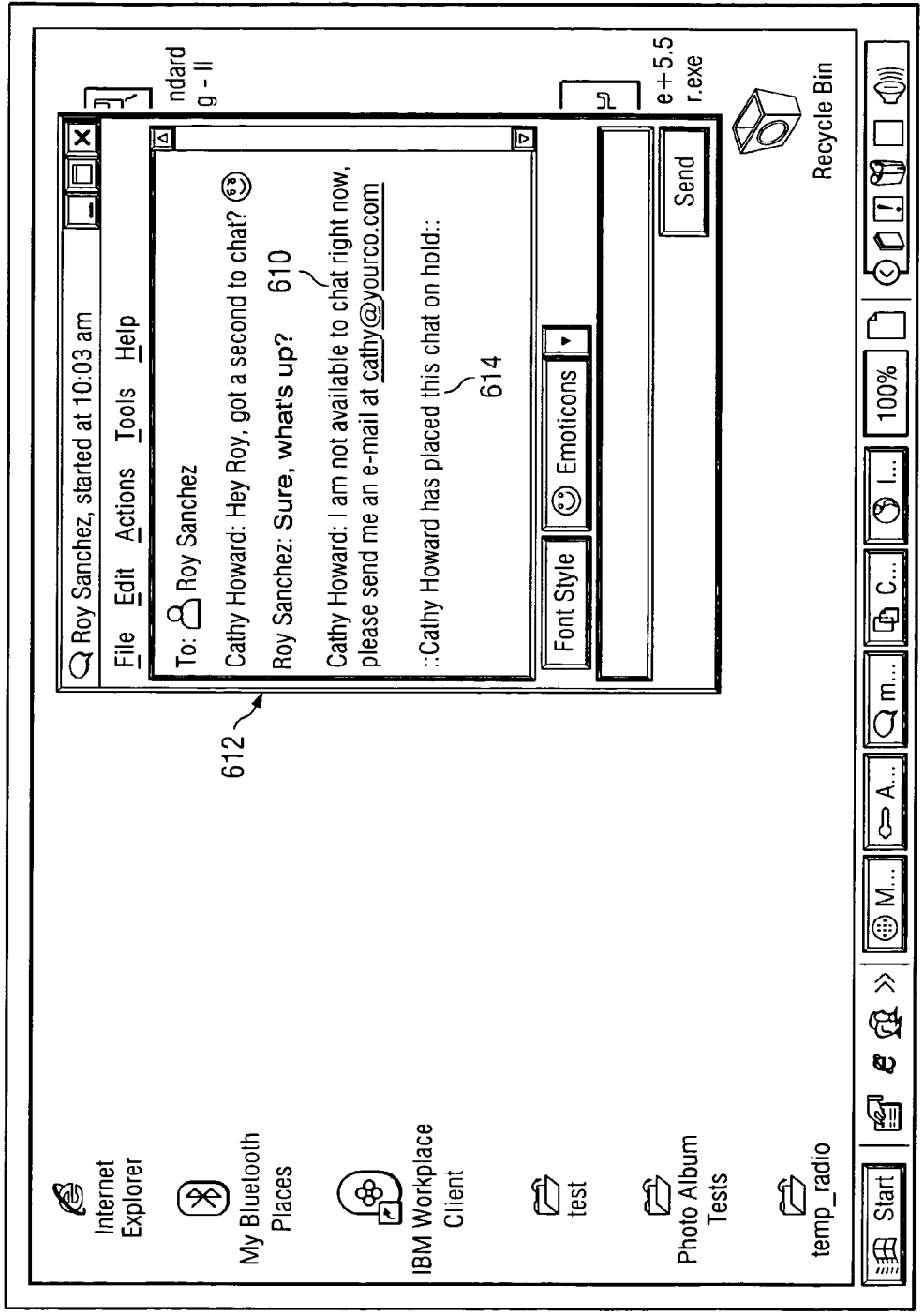

Turning now to FIGS. 6A-6C, an example of how placing an instant messaging dialog window into a designated area of a user's display allows an automated message to be sent to an instant message partner in accordance with a preferred embodiment of the present invention is shown. In this illustrative example, a user-defined message associated with a display area provides information to the instant message sender regarding the user's availability to respond to the message. FIGS. 6A-6C contain example instant messaging dialog windows, such as dialog windows 602-610. Dialog windows 602-610 are examples of dialog window 504 in FIG. 5.

In the particular example in FIG. 6A, dialog window 602 shows a conversation being conducted between two users, Cathy Howard and Roy Sanchez. In this illustrative example, dialog window 602 is presented in the lower left portion of user Cathy's desktop screen 600. As shown in dialog window 602, Cathy has received a message from Roy. However, if Cathy cannot provide an immediate response to Roy (e.g., Cathy has received an important phone call that she must take), Roy may not know that Cathy has been delayed and thus may be waiting to receive a message from Cathy at any moment.

FIG. 6B illustrates how Cathy, now busy with another task, may inform Roy that she will not be able to provide Roy with an immediate response to his message. As can be seen, Cathy may reposition instant messaging dialog window 602 containing the conversation with Roy to a new position on Cathy's desktop screen 600. For instance, FIG. 6B shows instant messaging dialog window 602 moved from the original position on desktop 600 to new position 604 on the desktop. The user may subsequently locate instant messaging dialog window 602 on the desktop 600 and carry on a conversation with a user through the dialog window. However, if Cathy has moved instant messaging dialog window 602 to a position on desktop 600 that she has designated as a hotspot area, an automated message associated with the hotspot area will be generated and sent to Roy.

For example, if Cathy has designated the right side of desktop 600 as a hotspot area, as shown by hotspot area 606, an automated message will be sent to Roy since Cathy has moved instant messaging dialog window 602 to hotspot area 606. Since Cathy is involved in another activity and cannot provide an immediate response to Roy, rather than having to type a message to Roy to let him know that she is not currently available to conduct a conversation with him, Cathy may drag the dialog window, such as dialog window 602, to a hotspot area, such as hotspot area 606, to inform Roy that she is currently unavailable to provide a response to his message.

In addition, as instant messaging dialog window 602 is moved into the hotspot area, highlights may be presented to Cathy in order to indicate the presence of the hotspot area. For example, highlights indicating the hotspot area, such as hotspot area 606 and a status message, such as "hold please" message 608, is provided to Cathy to inform her that instant messaging dialog window 602 has been moved into a hotspot area.

FIG. 6C shows Cathy's desktop after Cathy has placed the dialog window into the hotspot area. User-defined automated response message 610 has been sent from Cathy to Roy based on the movement of Cathy's instant messaging dialog window to a designated area of her desktop. Consequently, an automated message is displayed in Cathy's instant messaging dialog window 612, as well as Roy's instant message dialog window. Thus, automated response message 610 informs Roy that he should not expect an immediate response to his message, since Cathy has placed their conversation on hold.

In this illustrative example, Cathy's user-defined message, "I am not available to chat right now, please send me an e-mail at cathy@yourco.com" notifies Roy that Cathy is unavailable to continue their conversation. Other notifications also may be provided to the instant messaging partners, such as notification 614 which indicates who placed the conversation on hold (e.g., "::Cathy Howard has placed this chat on hold::"). Any method of displaying notifications may be used, such as, for example, displaying the notifications in a different color, font, or font size.

In addition to simply sending a message, an automated status change can occur as well. For example, if Cathy creates a "hold please" hotspot and then drags the dialog window containing her conversation with Roy into the hotspot, an automated message would be sent to Roy. However, this action may also automatically set a temporary status so that while Cathy is in "do not disturb" mode for Roy, but she is still available to chat with other users. Cathy may change this status with Roy by re-initiating the chat with Roy or by signing off. In this manner, Cathy is allowed to create a temporary "block" on incoming messages from a particular IM partner.

It should be noted that multiple areas of a user's display may contain hotspots. For example, one region of the screen may be defined as the hotspot for the message "Hold please, I'll just be a minute". In contrast, another region may be defined as the hotspot for the message, "I am not available to chat right now. Please send an email". As the availability of a user to respond to incoming messages changes, the automated message the user desires to send to other instant messaging partners may changed in order to reflect the user's changing availability. For example, the user may receive an instant message just as the phone rings. The user moves the dialog window to the right side of the screen, which the user has predefined as a hotspot. The instant messaging application then sends the pre-defined message "Hold please, I'll just be a minute". As the user's phone conversation begins, however, the user realizes that that the conversation will be lengthy. The user may then move the dialog window to the top of the display, which the user has predefined as a second hotspot. The instant messaging application then sends the pre-defined message, "I am not available to chat right now. Please send an email". In this manner, the user may update an instant messaging partner with more specific and timely availability information. Also, these multiple hotspots may have associated status changes for communicating the user's availability to respond to an instant message.

Although the illustrated example in FIGS. 6A-6C describes moving a dialog window into a hotspot area of the display, other methods of sending an automated message to an instant messaging partner may be used without moving the dialog window. For example, a menu item containing the names of the hotspots in the display may be added to the File menu of the dialog window. Thus, if Cathy wants to put Roy's message on hold, Cathy may select the File menu and then select the "hold please" hotspot menu item. In this manner, selecting a hotspot menu item will have the same effect as moving the dialog window to the hotspot area on the display. Also, a button, such as a "hold please" button, may be placed directly on the dialog window. If Cathy selects this button on the dialog window containing the conversation with Roy, a message will be generated and sent to Roy in the same manner as moving the dialog window to the hotspot area on the display.

In another alternative embodiment of the present invention, a movable "hold" icon may also be used to send an automated message to an instant messaging partner. It is well known in the prior art that windows may be minimized and are moveable in most modern graphical user interfaces. Thus, if a messaging window is minimized, the minimized window may be dragged and dropped onto the "hold" icon. The "hold" icon may be moveable within the graphical user interface. In this manner, dragging and dropping a minimized window onto a "hold" icon will have the same effect as moving the dialog window to the hotspot area on the display.

Figure 7:
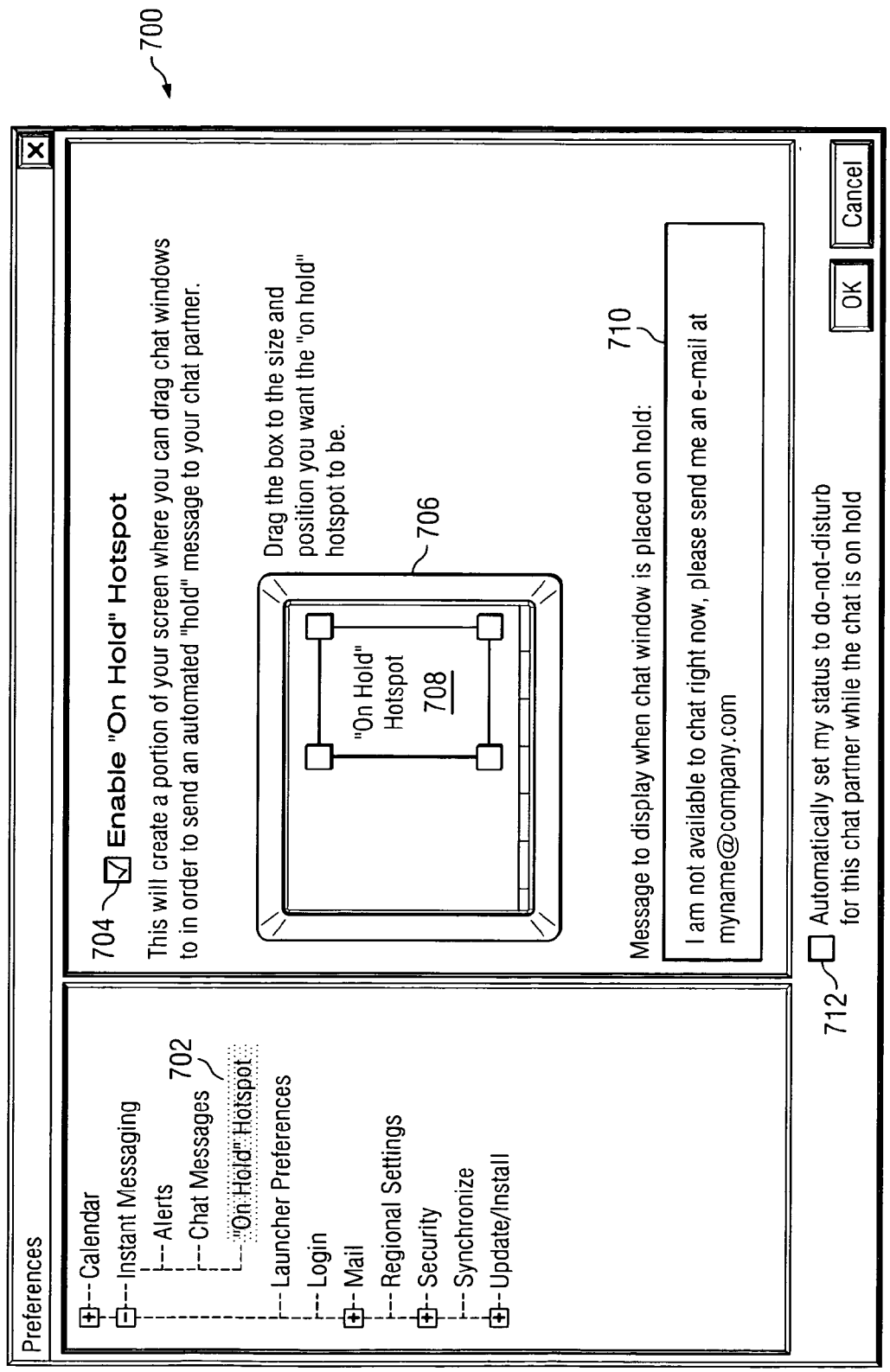
FIG. 7 is an example preferences window for defining and associating display areas with predefined messages in accordance with a preferred embodiment of the present invention.

Turning now to FIG. 7, an example preferences window for defining and associating display areas with predefined messages in accordance with a preferred embodiment of the present invention is shown. Preference window 700 may be presented to the user in a window, such as contact and control window 506 in FIG. 5. Preferences window 700 provides users with the ability to create "hotspot" areas in the user's display. Automated messages may then be assigned to each hotspot area in the user's display.

Preference window 700 is shown to contain a list of definable instant messaging items, such as "on hold" hotspot 702. Users may define hotspots to manage their availability. For example, when a user selects "on hold" hotspot 702, the user is presented with a series of hotspot preferences. The user may enable the "on hold" hotspot by selecting "on hold" hotspot checkbox 704. When "on hold" hotspot checkbox 704 is selected, the user is able to designate a portion of the display as the "on hold" hotspot. For example, as shown in representative screen window 706, the user may designate a section of the user's display, such as the right side of the screen, as the "on hold" hotspot. The user may position hotspot box 708 representing an "on hold" hotspot within the representative screen window 706. Users may also resize the hotspot box 708 by dragging the corners of hotspot box 708 corners to the desired size. Representative screen window 706 defines a portion of the user's screen where the user can drag a dialog window in order to send an automated "hold" message to the user's instant message partner.

Users may also define the automated messages to be sent to instant messaging partners. For example, message box 710 is provided to the user in which the user may type a message to be displayed when the dialog window is moved to the designated hotspot area (e.g., "I am not available to chat right now, please send me an e-mail at myname@company.com). The message in message box 710 is associated with the representative screen window 706. Although the example in FIG. 7 shows particular preference options, one of ordinary skill in the art would recognize that other preferences may be used in preferences window 700 to allow the user to define and associate display areas with predefined messages.

Users are also provided with the ability to couple a status change with any hotspot. A user may enable this status change by selecting status change checkbox 712. When status change checkbox is selected, the user is able to create a custom status change specific to a hotspot. For example, a user, such as user Cathy Robbins, is involved in multiple conversations and receives another message from a new person, such as Roy Sanchez. If Cathy wants to continue her conversations with the other instant messaging partners but does not want to be bothered by Roy's message, Cathy may quickly dismiss Roy's message by dragging the message to a "hold now" hotspot. Consequently, Roy receives the "I am not available to chat right now" message and sees that Cathy's status has changed to "do not disturb". However, Cathy is still able to chat with her other chat partners and receive new messages from people other than Roy.

Figure 8:
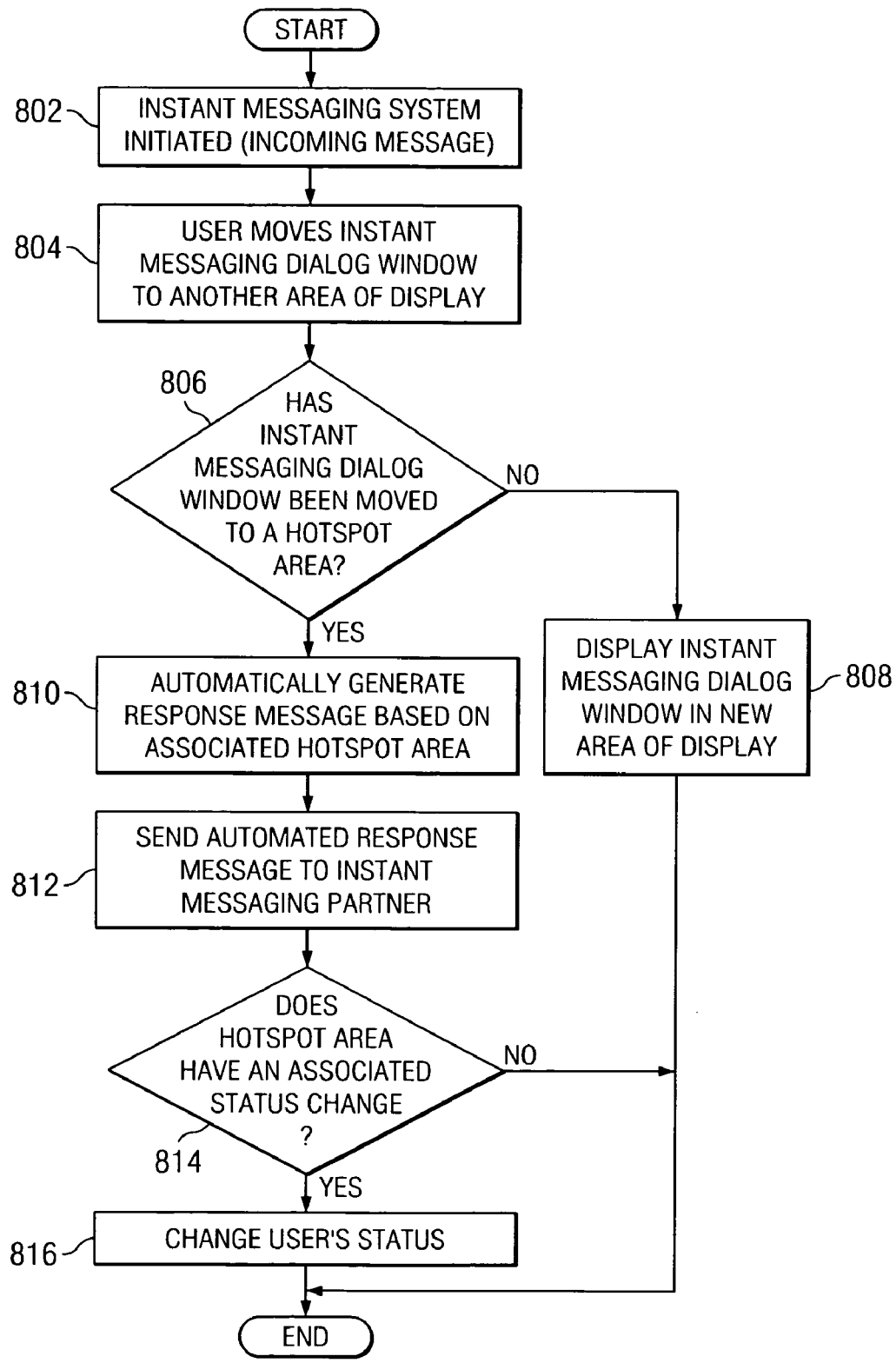
FIG. 8 is a flowchart of a process for using a user-defined automated instant message response with the positioning and movement of an instant messenger dialog window in accordance with a preferred embodiment of the present invention.

Turning now to FIG. 8, a flowchart of a process for integrating a user-defined automated instant message response with the positioning and movement of an instant messenger dialog window in accordance with a preferred embodiment of the present invention is described. The process illustrated in FIG. 8 may be implemented in an instant messing application, such as instant messaging application 500 in FIG. 5.

The process begins when the user receives an instant message in an instant message dialog window (step 802). Next, the user moves the instant messaging dialog window to another area of the display (step 804). The instant messaging application analyzes the movement to determine if the instant messaging dialog window has been placed into a designated hotspot area (step 806). If the window has not been placed in a hotspot area, the instant message is displayed in the new location (step 808), with the process terminating thereafter.

If the window has been placed in a hotspot area, the instant messaging application generates a response message based on the user defined message associated with the hotspot area (step 810). The response message is then sent to the instant messaging partner (step 812).

A determination is then made as to whether the hotspot area is associated with a status change (step 814). If so, the user's status is changed and displayed to the particular instant messaging partner (step 816). For example, the user's status may be changed to "do not disturb" for the duration that the conversation is on hold. When the dialog window is removed from the "hotspot" area or the user resumes the conversation with the blocked partner, the "hold" indication is cleared. While the user's status change is communicated to the particular instant messaging partner, other instant messaging partners are unaffected by this status change. Referring back to step 814, if no association between the hotspot area and a status change exists, the process terminates.

Thus, the present invention provides a method, apparatus, and computer instructions for sending a user's status information to an instant messaging partner by generating an automated status message in response to the user moving an instant messenger dialog window to an assigned area of a display. In this depicted example, the mechanism of the present invention enables the user to inform their messaging partner of their status in a timely and efficient way. In this manner, the present invention provides an advantage over current instant messaging systems by providing new and improved functionality, which allows a user's availability information, such as whether the user has place the instant messaging conversation on "hold", to be presented to an instant messaging partner if the user places the dialog window in a designated area of the user's display. With a single gesture, the user is allowed to quickly send a message and change his availability status, without interrupting other chat sessions that may be ongoing.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in an instant messaging system for allowing a user to provide an automated response of a user's availability to respond to an instant message, comprising:
   responsive to a user input comprising a movement of an instant messaging dialog window on a user's display, determining if the instant messaging dialog window has been moved into a designated hotspot area on the user's display;
   responsive to a determination that the instant messaging dialog window has been moved into a designated hotspot area on the user's display, automatically generating a response message based on a user defined message associated with the hotspot area; and
   sending the response message to a particular instant messaging partner.

2. The method of claim 1, further comprising:
   changing a user's instant messaging status, wherein the instant messaging status is changed only for the particular instant messaging partner.

3. The method of claim 1, wherein multiple designated hotspot areas are defined in the user's display.

4. The method of claim 1, further comprising:
   in response to a change in the user's availability to respond to the instant message, updating the response message sent to the instant messaging partner by moving the instant messaging dialog window to another designated hotspot area in the user's display.

5. The method of claim 1, wherein an association between a designated hotspot area and a response message is defined by the user.

6. The method of claim 1, wherein the response message is defined by the user.

7. The method of claim 1, wherein sending the response message to the instant messaging partner allows a user to communicate that the user is unavailable to respond to the message.

8. The method of claim 1, wherein the response message comprises information regarding a user's activity.

9. The method of claim 1, wherein the instant messaging dialog window is created in response to an incoming message.

10. The method of claim 1, wherein the instant messaging dialog window is created in response to an outgoing message.

11. An instant messaging system for allowing a user to provide an automated response of a user's availability to respond to an instant message, comprising:
- determining means for determining if an instant messaging dialog window has been moved into a designated hotspot area on a user's display in response to a user input comprising a movement of the instant messaging dialog window on the user's display;
- generating means for automatically generating a response message based on a user defined message associated with the hotspot area in response to a determination that the instant messaging dialog window has been moved into a designated hotspot area on the user's display; and
- sending means for sending the response message to a particular instant messaging partner.

12. The system of claim 11, further comprising:
- changing means for changing a user's instant messaging status, wherein the instant messaging status is changed only for the particular instant messaging partner.

13. The system of claim 11, wherein multiple designated hotspot areas are defined in the user's display.

14. The system of claim 11, further comprising:
- updating means for updating the response message sent to the instant messaging partner by moving the instant messaging dialog window to another designated hotspot area in the user's display in response to a change in the user's availability to respond to the instant message.

15. The system of claim 11, wherein an association between a designated hotspot area and a response message is defined by the user.

16. The system of claim 11, wherein the response message is defined by the user.

17. The system of claim 11, wherein sending the response message to the instant messaging partner allows a user to communicate that the user is unavailable to respond to the message.

18. The system of claim 11, wherein the response message comprises information regarding a user's activity.

19. The system of claim 11, wherein the instant messaging dialog window is created in response to an incoming message.

20. The system of claim 11, wherein the instant messaging dialog window is created in response to an outgoing message.

21. A computer program product in a computer readable medium for allowing a user to provide an automated response of a user's availability to respond to an instant message, comprising:
- first instructions for determining if an instant messaging dialog window has been moved into a designated hotspot area on a user's display in response to a user input comprising a movement of the instant messaging dialog window on the user's display;
- second instructions for automatically generating a response message based on a user defined message associated with the hotspot area in response to a determination that the instant messaging dialog window has been moved into a designated hotspot area on the user's display; and
- third instructions for sending the response message to a particular instant messaging partner.

22. The computer program product of claim 21, further comprising:
- fourth instructions for changing a user's instant messaging status, wherein the instant messaging status is changed only for the particular instant messaging partner.

23. The computer program product of claim 21, wherein multiple designated hotspot areas are defined in the user's display.

24. The computer program product of claim 21, further comprising:
- fourth instructions for updating the response message sent to the instant messaging partner by moving the instant messaging dialog window to another designated hotspot area in the user's display in response to a change in the user's availability to respond to the instant message.

25. The computer program product of claim 21, wherein an association between a designated hotspot area and a response message is defined by the user.

26. The computer program product of claim 21, wherein the response message is defined by the user.

27. The computer program product of claim 21, wherein sending the response message to the instant messaging partner allows a user to communicate that the user is unavailable to respond to the message.

28. The computer program product of claim 21, wherein the response message comprises information regarding a user's activity.

29. The computer program product of claim 21, wherein the instant messaging dialog window is created in response to an incoming message.

30. The computer program product of claim 21, wherein the instant messaging dialog window is created in response to an outgoing message.

31. A method in an instant messaging system for allowing a user to provide an automated response of a user's availability to respond to an instant message, comprising:
- responsive to a user selecting an item on a dialog window, wherein the item is associated with a hotspot area in a display, automatically generating a response message based on a user defined message associated with the hotspot area; and
- sending the response message to an instant messaging partner.

32. The method of claim 31, wherein the item is a menu item.

33. The method of claim 31, wherein the item is a button.

* * * * *